United States Patent [19]

Inoue et al.

[11] Patent Number: 5,476,677
[45] Date of Patent: Dec. 19, 1995

[54] CEREALS TREATED UNDER HIGH PRESSURE AND METHOD OF PREPARING THE SAME

[75] Inventors: Tadashi Inoue, 3-9, Shiroyamadai 1-chome, Hashimoto-shi, Wakayama 648; Sukeyoshi Kato, Gojo, both of Japan

[73] Assignee: Tadashi Inoue, Wakayama, Japan

[21] Appl. No.: 128,324

[22] Filed: Sep. 29, 1993

Related U.S. Application Data

[63] Continuation of Ser. No. 916,850, Aug. 18, 1992, abandoned.

[30] Foreign Application Priority Data

Dec. 28, 1990 [JP] Japan .................................. 2-418678

[51] Int. Cl.⁶ .......................... A23B 9/00; A23L 1/00
[52] U.S. Cl. ........................ 426/618; 426/462; 426/507
[58] Field of Search .................................. 426/443, 455, 426/456, 459, 460, 507, 618, 331

[56] References Cited

U.S. PATENT DOCUMENTS

| | | | |
|---|---|---|---|
| 2,438,939 | 4/1948 | Ozai-Durrani | 426/460 |
| 3,052,556 | 9/1962 | Baile | 426/460 |
| 3,083,102 | 3/1963 | Carcassonne-Leduc | 426/460 |
| 3,803,334 | 4/1974 | Hunnell | 426/331 |
| 3,872,020 | 3/1975 | Yamagishi et al. | 426/331 |
| 3,983,214 | 9/1976 | Misato et al. | 424/180 |
| 4,765,996 | 8/1988 | Misaki et al. | 426/72 |
| 5,002,788 | 3/1991 | Satake | 426/507 |

FOREIGN PATENT DOCUMENTS

| | | |
|---|---|---|
| 56-72655 | 6/1981 | Japan . |
| 64-13955 | 1/1989 | Japan . |
| 9102464 | 3/1991 | WIPO . |

OTHER PUBLICATIONS

Rikimaru Hayashi, "Pressurized Food-Research and Development", (25 Aug. 1990) Sanei Shuppan, p. 285, line 2–p. 286, line 6.
Foods and Their Development, No. 12, vol. 23, (1988), "Process Reservation Sterilization of Foods with Use of a High Pressure-present status and view", Hayashi, pp. 40–45.
Food Processing Machinery, No. 2, vol. 25, (1988), "Use of a High Pressure in Food Industry", pp. 53–59, Hayashi.
Starch Science, No. 3, vol. 34, (1987), "Use of Phenomena under a High Pressure in Food Processing (4): Digestion of Amylase in a High Pressure Treated Starch", Hayashi et al., p. 261.
Chemistry and Organisms, No. 11, vol. 25 (1987), "Seeking for Possiblity of Use of a High Pressure in the Food Processing Field–Various Uses for Cooking, Processing, Reservation, etc . . . ".
Agric. Biol. Chem. 53(11), pp. 2935–2939 (1989), Hayashi et al., "Application of High Pressure to Food Processing: Pressurization of Egg White and Yolk, and Properties of Gels Formed".
Agric. Biol. Chem. 54(1), pp. 183–189, 1990, "Application of High Pressure to Food Processing: Textural Comparison of Pressure– and Heat–induced Gels of Food Proteins", Hayashi et al.
Agric. Biol. Chem. 53(9), pp. 2543–2544, 1989, "Increased Amylase Digestibility of Pressure–treated Starch", Hayashi et al.
Engineering and Food, vol. 2, pp. 815–826, 1989, "Appli

(List continued on next page.)

*Primary Examiner*—George Yeung
*Attorney, Agent, or Firm*—Larson and Taylor

[57] ABSTRACT

A high pressure-treated cereal which has been subjected to a pressure of not lower than 1000 atm to not higher than 9000 atm in a liquid within a pressure chamber for a period of time required for internal denaturation and subsequently dried, and a method of preparing the cereal. The cereal can be cooked with reduced labor and time and is less allergenic.

10 Claims, 4 Drawing Sheets

OTHER PUBLICATIONS cation of High Pressure to Food Processing and Preservation: Philosophy and Development", Hayashi.
Food and Their Developments, No. 12, vol. 23 of 1988 (English Translation).
Food Processing Machinery, No. 2, vol. 25 (1988), "Use of a High Pressure in Food Industry", Hayashi, pp. 53–59 (English Translation).

Starch Science, No. 3, vol. 34, (1987), "Use of the Phenomena under a High Pressure in Food Processing (4): Digestion of Amylase in a High Pressure Treated Starch", Hayashi et al., p. 261. (English Translation).

Chemistry and Organisms, No. 11, vol. 25 (1987), "Seeking for Possibility of Use of a High Pressure in the Food Processing Field–Various Uses for Cooking, Processing, Reservation, etc., likewise Heat".

CEREALS TREATED UNDER HIGH PRESSURE AND METHOD OF PREPARING THE SAME

This application is a continuation of application Ser. No. 07/916,850 filed Aug. 18, 1992; now abandoned.

FIELD OF INDUSTRIAL APPLICATION

The present invention relates to a method of preparing cereals treated under high pressure. The term "cereals" as used herein refers to cereals as hulled and as polished such as unpolished rice and polished rice, barley, wheat, rye and oats, and such cereals in the husk.

PRIOR ART AND PROBLEMS INVOLVED

When to be eaten, rice must usually be treated by the following steps.
 a. Washing
 b. Steeping
 c. Boiling
 d. Standing as boiled Rice is washed in the washing step a., and water is allowed to fully penetrate into the rice in the steeping step b. These steps require about one hour. The boiling step c. and the step d. of allowing the rice to stand as boiled require about 50 minutes. Thus, the entire process takes about 1 hour and 50 minutes.

Accordingly, the cooking process requires much labor and time before eating and is cumbersome especially to unmarried persons. Rice could be cooked in a shortened period of time by omitting the step b. of steeping and the step d. of standing, but this is usually undesirable since the rice would then taste very poor.

To ensure savings in labor and time for cooking rice, rice is retorted or otherwise processed and prepared as enclosed, for example, in pouches. More specifically, rice is cooked by the steps a. to d. and enclosed in packets in units of one to several meals. When purchased and heated again in a household microwave oven, the processed rice is ready for eating. The rice can therefore be cooked with reduced labor in a shortened period of time. However such processed food is preserved after having been heated and needs to be heated again for eating. This not only results in a greatly impaired taste but also seriously breaks down nutrients such as vitamins and calcium.

It is known that rice can be improved in taste and nutriment by preserving rice in the husk and polishing the rice immediately before eating. However, the process of polishing through cooking requires much time and labor if practiced immediately before eating. It is therefore desired to preserve rice in the husk, render rice more tasty and more nutritious, and make rice serviceable with reduced time and labor.

Among allergies attributable to foods, increasing in recent years are those due to cereals, especially rice and wheat. Cereal allergies develop chiefly as atopic dermatitis, and the primary allergen thereof is found in globulin fractions. Since globulin is resistant to heat, it is difficult to make rice allergenically less active as by boiling. Storage of rice results in no noticeable reduction in the allergenic activity. Moreover, globulin is present uniformly in the albumen of rice and is therefore not substantially removable by polishing. Thus, extreme difficulties are encountered in obtaining rice which is less likely to cause allergies.

The foregoing problems relating to the time and labor required for cooking and involved in abating allergies are similarly encountered with unpolished rice, barley, wheat, oats, rye and other cereals as well as with polished rice although different in extent.

An object of the present invention is to provide cereals which are serviceable with reduced labor and time and which are excellent in taste and nutriment, and a method of preparing the cereal.

Another object of the invention is to provide cereals which are less allergenic and a method of preparing the cereal.

MEANS FOR SOLVING THE PROBLEMS

To fulfill the above objects, the present invention provides a method of preparing a cereal treated under a high pressure, the method being characterized by placing a cereal into a liquid within a pressure chamber, applying a pressure of not lower than 1000 atm to not higher than 9000 atm to the pressure chamber for a period of time required to internally denature the cereal, and drying the cereal after the application of pressure (first aspect of invention).

The invention further provides a cereal treated under a high pressure, the cereal being characterized in that the cereal has been subjected to a pressure of not lower than 1000 atm to not higher than 9000 atm in a liquid within a pressure chamber for a period of time required for internal denaturation and subsequently dried (second aspect of the invention).

ADVANTAGES OF THE INVENTION

According to the present invention, a cereal is subjected to a high pressure of not lower than 1000 atm to not higher than 9000 atm for a predetermined period of time and therefore denatured as affected characteristically by the high pressure. (Denaturation under high pressure is described in detail in "High Pressure Use in Food," published by San-Ei Shuppan Co., on Jul. 15, 1989.) The denatured cereal does not appear greatly different from the cereal in the usual state.

The denaturation breaks down the three dimensional structure of raw starch, rendering the starch readily decomposable by cooking. Since the high pressure applied acts on the cereal throughout its interior instantaneously, the cereal is denatured substantially uniformly in its entirety including the interior. As a result, the cereal is made ready for eating when heated for a short period of time. Especially because rice or barley must be cooked thoroughly without leaving any uncooked interior portion, the high pressure treatment is more advantageous than the heat treatment which requires some time for the heat to reach the inner portion from the surface.

With respect to the abatement of allergies, we have found that the denaturation resulting from the high pressure treatment remarkably reduces the globulin content of cereals. Accordingly, eating the cereal treated under a high pressure is effective for diminishing allergies, especially atopic dermatitis.

The pressure to be applied is not lower than 1000 atm to not higher than 9000. Under pressures lower than 1000 atm, the cereal will not be denatured sufficiently, and can not be made suitable to eat when heated for a short period of time. Further pressures less then 1000 atm fail to sufficiently lower the globulin content of the cereal and to effectively diminish allergies. Application of pressures in excess of 9000 atm necessitates a very large pressure apparatus and is not suited to actual preparation. When the pressure applied is at least 2000 atm, it is possible to shorten the cooking time and reduce the globulin content more remarkably, and to sterilize the cereal.

The pressure application time differs with the pressure to be applied and is so determined as to fully denature the cereal internally. Preferably it is generally at least 10 minutes. Pressure application for less than 30 minutes usually achieves a satisfactory result.

When the cereal is immersed in an aqueous solution or water for a predetermined period of time before the high pressure treatment, the immersion and the high pressure treatment cause water to effectively penetrate into the cereal, with the result that the cereal can be cooked very uniformly and given a good taste.

When the cereal is immersed before the high pressure treatment in an aqueous solution containing at least one of a sucrose fatty acid ester, sodium hypochlorite and sodium hydrogencarbonate, the sterilizing activity of the aqueous solution or the activity thereof to inhibit growth of fungi or bacteria renders the cereal preservable for a long period of time after the high pressure treatment. The cereal permits water to penetrate thereinto more effectively when immersed in the aqueous solution containing the sucrose fatty acid ester than when immersed in simple water. The immersion in the aqueous solution of sucrose fatty acid ester assures the cereal of high safety as a food and is also effective for inhibiting bacterial spore which can not be destroyed merely by the application of pressure. The immersion in the aqueous solution of sodium hypochlorite is highly effective for sterilization and advantageous for long-term preservation. The aqueous solution of sodium hydrogencarbonate is high in pH and therefore acts to inhibit fungi or bacteria. The immersion time is such as is suitable for the penetration of water into the cereal and is generally preferably at least 1 hour to less than 10 hours. It is more preferably less than 6 hours when sodium hypochorite or sodium hydrogencarbonate is used.

The temperature of the liquid within the pressure chamber to be subjected to an increased pressure is preferably at least 0° C. because if it is lower than 0° C., the liquid is likely to freeze to impede the penetration of water. For the same reason, the temperature of the aqueous solution for the immersion of the cereal before the treatment is preferably at least 0° C.

For long-term preservation, the liquid temperature within the pressure chamber to be pressurized is preferably up to 5° C. Temperatures over 5° C. permit growth of fungi or bacteria, rendering the resulting cereal unsuited to preservation.

To give a good taste to the treated cereal as cooked, the liquid temperature within the pressure chamber to be pressurized is preferably up to 50° C. Temperatures over 50° C. markedly denature the starch to result in an impaired taste. From this viewpoint, the liquid temperature is more preferably up to 45° C.

To shorten the pressure application time, the liquid temperature within the pressure chamber to be pressurized is preferably at least 50° C.

Suitable pressure application time differs with the pressure to be applied, whereas liquid temperatures not lower than 50° C. are very effective for shortening the application time. Nevertheless, liquid temperatures over 90° C. give a seriously impaired taste to the cereal as cooked.

The cereal is dried after the high pressure treatment. For long-term preservation, it is important to maintain the cereal in a dry state. For this purpose, it is desired that the cereal as dried be enclosed in a container or preserved in a dry chamber. Preferably, the cereal has a water content of not lower than 10% to not higher than 30% when dried. If the water content is over 30%, fungi or bacteria will proliferate, rendering the cereal unsuitable for long-term preservation. More preferably, the water content is up to 20% especially in the case of rice, wheat, barley or other cereal before or after polishing, or is up to 16% in the case of such a cereal before husking. If the water content is less than 10%, the cereal is liable to crack.

EMBODIMENTS

With reference to the accompanying drawings, the present invention will be described below as it is applied to polished rice for illustrative purposes.

Polished rice is treated under a high pressure in the following manner.

a. Polished rice is placed into a plurality of enclosing containers in an amount of one meal (e.g., 140 g) to several meals in each container, or a larger amount of polished rice is placed into one container. The enclosing containers to be used are bags and other various containers which are adapted to transmit the pressure applied thereto to the interior thereof.

b. An aqueous solution is poured into the container. The aqueous solution is an aqueous solution containing at least one of a sucrose fatty acid ester, sodium hypochlorite and sodium hydrogencarbonate. It is suitable that the amount of the aqueous solution be about twice the volume of the rice.

c. The air in the container is thereafter removed, and the container is sealed off. The air is removed preferably through a tube connected to a vacuum pump and inserted into the container. Preferably, the container is sealed off at a portion thereof closer to one end thereof than the tube while the air is being removed continuously.

d. The container is immersed in water at 0° to 5° C. for about 60 minutes, whereby some water is allowed to penetrate into the rice before the application of pressure.

e. The container is placed into a pressure chamber. The pressure chamber is filled with distilled water, a liquid containing an antioxidant or some other suitable pressure liquid. A high pressure is applied to the pressure chamber for a suitable period of time. The pressure is within the foregoing range. The pressure application time is usually 10 minutes to 30 minutes although variable with the hardness and like properties of the rice.

f. After the application of pressure, the container is withdrawn from the pressure chamber. In this state, the water in the container has almost entirely penetrated into the grains of rice.

g. The rice is withdrawn from the container and dried. The drying may be done at room temperature, or in a heated atmosphere which will not influence the composition of the rice. Drying by microwave irradiation is advantageous in preventing cracking due to drying presumably because the water in the rice grains is changed by microwave irradiation to water vapor, which remains generally uniformly over the entire surfaces of the grains during drying.

h. The rice treated under the high pressure is thereafter enclosed in a container in amount of one meal (e.g., 140 g) to several meals, or in a larger amount as required. The container can be an enclosing container, rigid plastics or metal can or any other suitable one. It is advantageous to place the rice into the container as evacuated to a vacuum or to place a deoxidant thereinto along with the rice for preventing degradation of the rice with time.

Incidentally, when polished rice is placed into the enclosing container, chopped vegetables, meat, mushrooms or the like can be suitably added to the rice, whereby rice can be given improved taste and flavor when cooked.

Unhulled rice, when to be treated under a high pressure, is placed into the enclosing container instead of polished rice, and water is poured into the container as in the foregoing method. The pressure application time is 10 minutes to 30 minutes to be suitable. The other steps are the same as in the case of polished rice.

Figure 1:
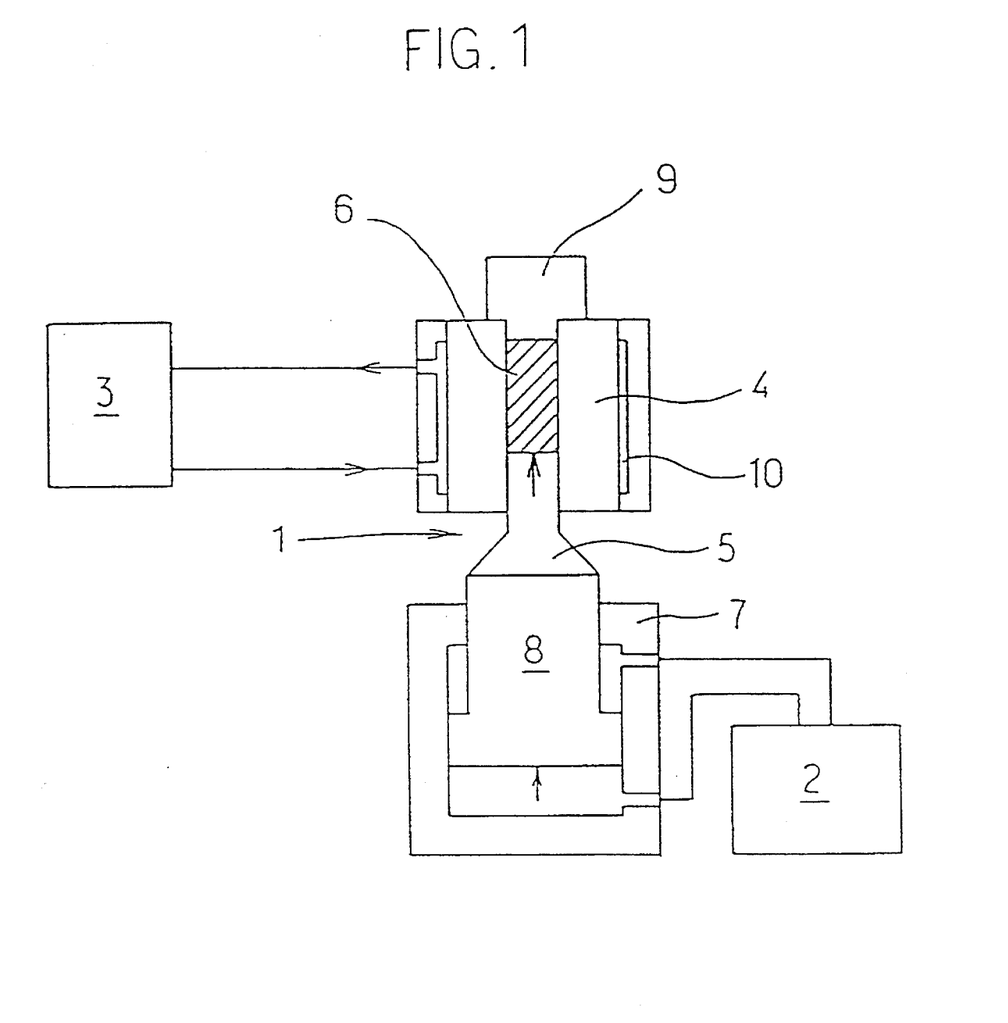
FIG. 1 is a diagram showing a high pressure treatment apparatus for use in preparing high pressure-treated rice.

Next, a high pressure treatment apparatus for use in the above methods will be described. FIG. 1 schematically shows the apparatus. The high pressure treatment apparatus comprises a pressurizing assembly 1, hydraulic unit 2, unit 3 for circulating water of constant temperature and water jacket 10. The pressurizing assembly 1 comprises a container side wall 4 and a container upper wall 9 which form a pressure chamber 6 inside thereof, a high-pressure piston 5 movable into and out of the pressure chamber 6, a low-pressure piston 8 positioned under and integral with the high-pressure piston 5, and a low-pressure cylinder 7 for driving the low-pressure piston 8.

For operation, the low-pressure piston 8 is urged upward inside the low-pressure cylinder 7 by the hydraulic unit 2. With this movement, the high-pressure piston 5 integral with the low-pressure piston 8 is also urged upward inside the pressure chamber 6. The high-pressure piston 5 thus urged gives an increased pressure to the pressure chamber 6 which is filled with water or pressure liquid. The internal pressure of the pressure chamber 6 is dependent on the ratio between the low-pressure piston 8 and the high-pressure piston 5 in the area to be subjected pressure, and the pressure of the hydraulic unit is amplified in corresponding relation with the ratio and applied to the pressure chamber. In the present example, the pressure is amplified ten times and a high pressure can be quickly produced. The container side wall 4 is surrounded by the water jacket 10, through which constant-temperature water from the water circulating unit 3 is circulated, so that the internal temperature of the pressure chamber 6 can be adjusted, to 0° C. to 5° C. by controlling the temperature of the circulating water.

Various other high pressure treatment apparatus are usable which have a pressure chamber and adapted to exert a high pressure on a liquid in the pressure chamber.

Figure 2:
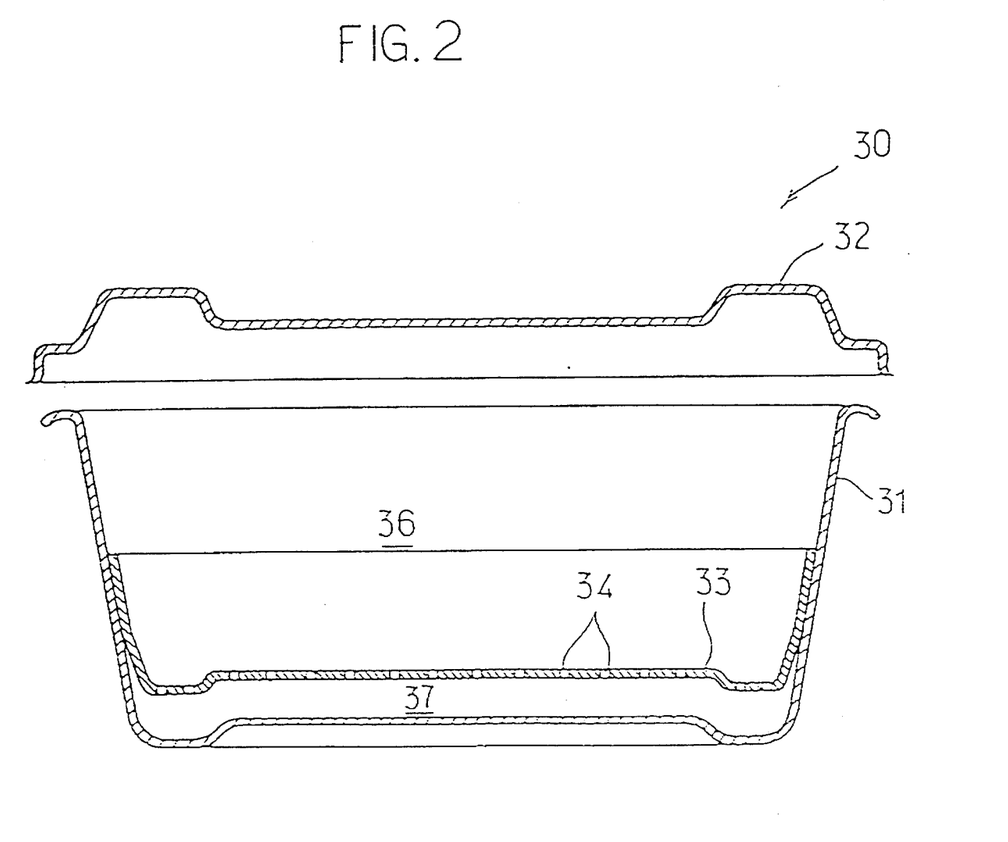
FIG. 2 is a view in vertical section showing a container for use in cooking the high pressure-treated rice in a microwave oven.

Next, containers for use in cooking the high pressure-treated rice in a microwave oven will be described. While various containers can be used for the microwave-cooking of the high pressure-treated rice, the following containers are preferable for the microwave-cooking. FIG. 2 shows a container 30 comprising a container body 31 in the form of a bowl, a closure 32 for the container body and a partition 33 removably provided in the container body. These members are made of various resin materials usable for the treatment in the microwave oven to be described below and free of problems as to food sanitation. Examples of such suitable materials are polypropylene, "EVAL" etc. The size of the container body 31 is so determined that the pressure-treated rice can be accommodated in the upper portion 36 thereof on the partition 33 in an amount required for the contemplated use. The upper portion of the present embodiment accommodates about 140 g of rice. The closure 32 is placed on the container body 31 to cover an upper opening thereof with such airtightness that the steam produced during cooking in the microwave oven can be held within the container while suitably releasing an increase in the internal pressure. The partition 33 is in the form of a shallow bowl and has a side wall which is so shaped as to be substantially in contact with the inner side surface of the container body 31. The bottom wall of the partition divides the interior of the container body into the upper portion 36 for accommodating the high pressure-treated rice, and a lower portion 37 for containing water for steaming the rice. The bottom wall of the partition 33 is formed with a multiplicity of steam ports 34 for holding the upper portion 36 and the lower portion 37 in communication with each other therethrough. The lower portion 37 has the depth to be described below so as to accommodate an amount of water sufficient to steam the high pressure-treated rice without making the container excessively bulky. When the container is adapted to contain 140 g of the treated rice like the present embodiment, the depth is preferably 2 to 15 mm, more preferably 5 to 8 mm.

Using the container and a microwave oven, the high pressure-treated rice is cooked to a state suited to eating in the following manner. First, the partition is installed in the container body 31, and a suitable amount of the high pressure-treated rice is placed into the body. Next, water is placed into the body in an amount slightly excessive relative to the rice, i.e., usually about 1.5 to about 1.6 times the amount of the rice. The higher the temperature of the water, the shorter will be the cooking time, whereas the water may have room temperature. The container is closed with the closure 32 and placed into the microwave oven, which is then operated. Although the operating time varies with the amount of treated rice and the output of the microwave oven, it is suitable to boil 140 g of the treated rice for about 5 to about 7 minutes and steam the rice for about 5 to 10 minutes, for example, when the microwave oven is for household use. The operation of the microwave oven first boils the water, boiling the high pressure-treated rice. Since the treated rice has a large amount of water already contained therein, such a supply of water to the rice as is needed in the case for cooking usual rice is unnecessary. When the amount of water decreases below the partition 33 owing to boiling, the rice is steamed with water vapor. The arrangement wherein the peripheral edge of the partition 33 is in contact with the inner side surface of the container body 33 eliminates the likelihood that the steam will escape through a space between the partition and the container body and reach the top portion of the container without coming into contact with the rice. However, a clearance, if present between the partition and the container body, will not impair the substantial function of the present invention although somewhat lowering the efficiency of action of the steam and the uniformity of treatment in the interior of the container. This is also true of the following embodiments. Owing to the foregoing unique nature, the high pressure-treated rice is cooked very satisfactorily by the boiling and steaming which are effected for the respective short periods of time already described.

Steam ports can be formed also in the side wall of the partition unlike the above partition. Further the partition may be fixed to the container wall.

Figure 3:
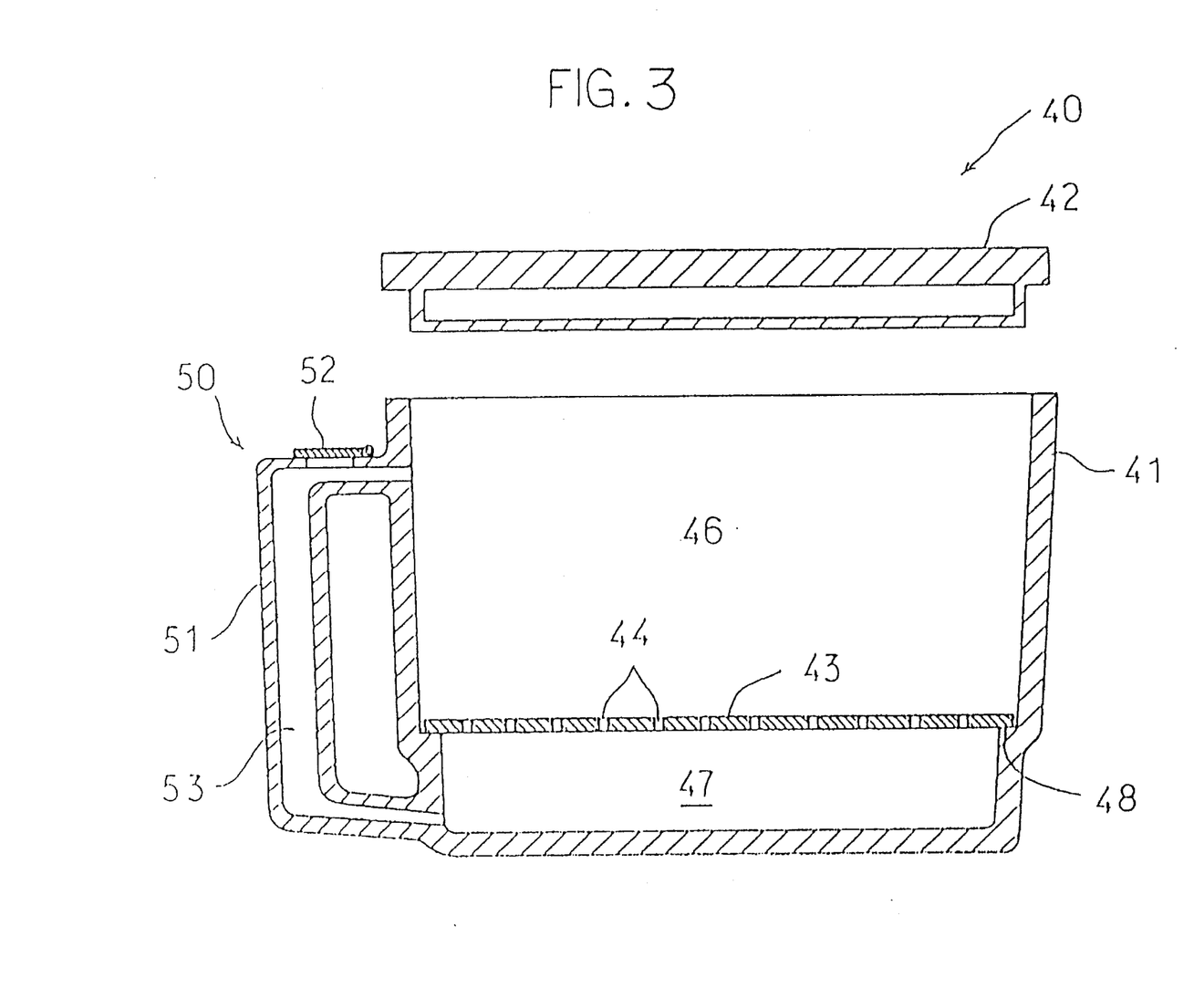
FIG. 3 is a view in vertical section showing another example of container for use in cooking the high pressure-treated rice in a microwave oven.

FIG. 3 shows another container embodying the present invention for use in cooking the high pressure-treated rice. The container 40 comprises a container body 41, a stepped portion 48 formed on the inner surface of the side wall of the body and a partition 43 resting on the stepped portion 48. A handle-gauge portion 50 is provided on a side portion of the container body 41. The handle-gauge portion 50 comprises a U-shaped projection 51 projecting from the container body 41 radially outwardly thereof, and a valve 52 provided on the top of the projection 51. The projection 51 has a transparent or semitransparent portion which extends vertically and which is hollow. The top of the hollow portion 53 is positioned above the level of water to be contained in the container body 41, and the bottom of the portion 53 is positioned in the vicinity of the bottom of the container body 41. The hollow portion communicates at the top and the bottom with the interior of the container body. The valve 52 is hinged to the top wall of the projection 51 and openably covers a small hole 54 formed in the top wall. With the present embodiment, a closure 42 is tightly fittable in the opening of the container body 41.

The container 40 is used for cooking the high pressure-treated rice also in the same manner as already described. The present embodiment is provided with the handle-gauge portion 50 having the transparent or semitransparent portion, so that the level of water in the handle-gauge portion 50 indicates the amount of water in the container even if the side wall of the container body is opaque. An increase in the vapor pressure during cooking is released through the valve 52. The construction wherein the bottom of the hollow portion 53 is positioned close to the bottom of the container body prevents steam from escaping through the hollow portion to the top portion of the container even if the level of water within the container is lower than the partition.

Figure 4:
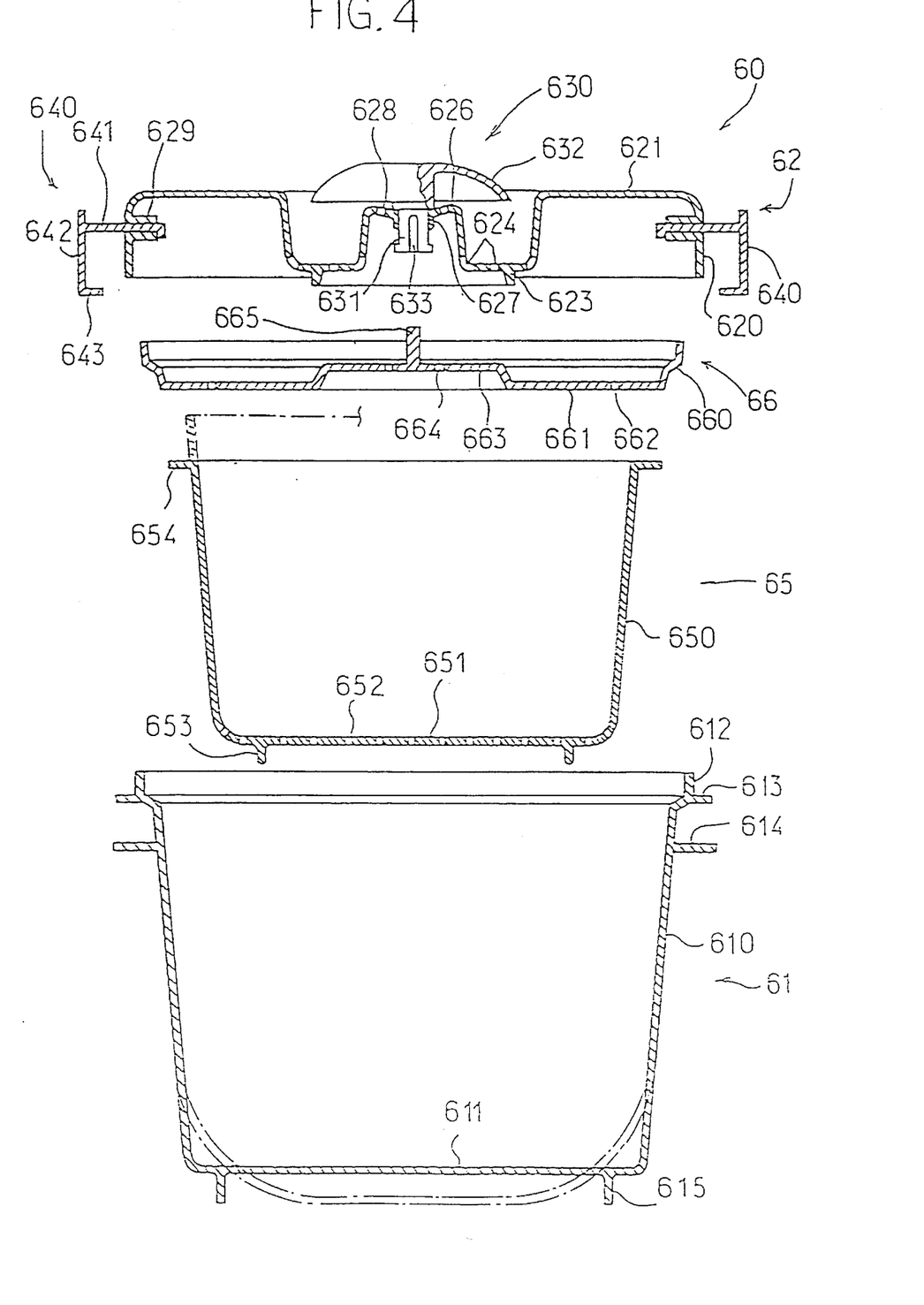
FIG. 4 is a view in vertical section showing another example of container for use in cooking the high pressure-treated rice in a microwave oven.

FIG. 4 shows another container embodying the present invention for use in cooking the high pressure-treated rice. The container 60 comprises a container body 61, an outer closure 62, a partition 65 and an inner closure 66. The container body 61 is in the form of a bowl comprising a side wall 610 and a bottom wall 611. A flange 613 is formed around the outer periphery of the body 61 at a position a small distance below a top edge 612 defining an opening. A knob 614 is provided below the flange. A leg 615 extends downward from the lower surface of the bottom wall 611. The lid of the container comprises the outer closure 62 and the inner closure 66. The outer closure 62 comprises a side wall 620 fittable to the opening top edge 612 of the container body in intimate contact therewith, an upper wall 621 extending from the side wall to the central portion, a pressure control valve 630 provided on the upper wall 621 centrally thereof, and fasteners 640 supported by the side wall 620. The upper wall 621 is formed with an annular recessed portion close to its center, and an annular ridge 623 is formed on the lower surface of the recessed portion. Steam ports 624 and 625 are formed in the recessed portion respectively on the inner side and the outer side of the ridge immediately adjacent thereto. The upper wall 621 has a central protrusion 626 formed with a hole 627 centrally thereof and steam ports 628 around the hole. The side wall 620 has two guide bores 629 extending therethrough and opposed to each other. The pressure control valve 630 comprises a stem 631 inserted through the hole 627 in the central protrusion of the outer closure, and a disk 632 extending radially from the upper end of the stem. The stem 631 is hollow and has a plurality of grooves 633 communicating with the hollow portion and extending axially of the stem. The stem 631 has opposite ends of an increased diameter for restricting the range of sliding movement of the stem in the hole 627. The fastener 640 comprises a slide portion 641 inserted through the guide bore 629 in the side wall 620, a vertical portion 642 extending downward from the slide portion, and an engaging portion 643 extending from the lower end of the vertical portion radially inwardly of the outer closure. The engaging portion 643 is so disposed as to engage with the flange 613 on the container body 61 when the slide portion 641 is pushed into the guide bore 629 after the outer closure 62 is fitted over the container body 61 with the slide portion 641 pulled out. The partition 65 comprises a side wall 650 and a bottom wall 651 and is in the form of a bowl. The bottom wall 651 is formed with a multiplicity of steam ports 652 and has legs 653 on its lower surface. The legs 653 serve to form a chamber between the partition and the bottom wall 611 of the container body for accommodating water for steaming the rice and have such a length that the chamber has the same depth as the corresponding chamber of the embodiment of FIG. 4. The top edge of the side wall 650 is provided with a flange 654. When the partition 65 is placed into the container body 61, the interior of the container body is divided into an upper portion and a lower portion by the bottom wall 651, with the flange in contact with the side wall 610 of the container body. The inner closure 66 comprises a side wall 660 supportable by the top wall 612 of the container body in contact with the inner surface thereof, and a bottom wall 661 extending from the lower end of the side wall. Steam ports 662 are formed in the bottom wall close to the outer periphery thereof. The central portion of the bottom wall is in the form of a protrusion 663 which is slightly raised. When the outer closure 62 is closed, the annular ridge 623 comes into contact with the peripheral edge portion of the protrusion 663. Steam ports 664 are formed also in the protrusion 663. The protrusion 663 is centrally formed with a knob 665 extending upward vertically.

The container 60 is used in the following manner. The partition 65 is installed in the container body 61, and the high pressure-treated rice and water are placed therein. The inner closure 66 is placed over the partition, and the outer closure 62 is fitted over the closure 66, and is fastened to the container body by the fasteners 640. The container 60 in this state is placed into a microwave oven and heated. When the water in the container boils, the internal pressure of the container builds up, permitting steam to be released through the steam ports 662, 664 of the inner closure and through the steam ports 624, 625, 628 of the outer closure. Upon the increase in the pressure exceeding a certain value, the steam pressure lifts the pressure control valve 630, permitting the release of steam also through the grooves 633 to mitigate the pressure. Accordingly, the weight of the pressure control valve, when adjusted, makes it possible to heat the rice with the internal pressure of the container elevated to a desired value and to cook the rice more satisfactorily than under the usual pressure in a shortened period of time. When the steam liquefies between the outer closure 62 and the inner closure 66, the resulting water returns downward through the steam ports 662. With the present container, the contact of the top flange 654 of the partition 65 with the side wall 650 of the container body also obviates the likelihood that the steam will escape through a clearance between the partition and the container body to reach the top portion of the container without coming into contact with the pressure-treated rice. Instead of the flange 654, the top edge may be extended so as to contact the lower surface of the inner closure 66 as indicated at the upper portion of the partition 65 in broken lines in FIG. 4. Since the bottom wall of the container body has the legs 615, the bottom surface of the container can also be irradiated with microwaves in the microwave oven.

In the case where the microwave oven has the function of automatically deflecting microwaves over a wide range, it is advantageous that the container 61 have a rounded bottom portion as indicated in dot-and-dash lines so as to be exposed to microwaves more readily over the bottom surface.

TEST EXAMPLE

Next, rice as treated under a high pressure according to the invention was tested from the viewpoint of abatement of allurgies as will be described below.

The test samples were rices pressure-treated by the method of the invention (hereinafter referred to as "treated rices") and usual rice (hereinafter referred to as such).

The protein contained in the sample was fractionated by the method described in a book on experiments in food engineering ("Book on Experiments in Food Engineering (Vol. 1)," edited by Kyoto University, Food Engineering Course of Agricultural Department, P602(1970), published by Yokendo Co., Ltd.) to obtain four fractions, i.e., albumin, globulin, prolamin and glutelin.

The nitrogen content of each of the fractions was measured by the Kjeldahl method.

The nitrogen contents of the fractions of the sample and the protein content of the sample were calculated from the values thus obtained and the total nitrogen content of the sample determined without fractionation. The water content was measured by the atmospheric presure heating-drying method.

Table 1 shows the test results.

With reference to Table 1, the pressure treatment was conducted at 6000 atm for treated rice 1, at 1000 atm for treated rice 2, at 2000 atm for treated rice 3 and at 3000 atm for treated rice 4. The pressure treatment for each of treated rices 1 to 4 was conducted at a liquid temperature of 5° C. in the pressure chamber by applying the pressure for 20 minutes, and the rice as treated was dried to a water content of 20%.

For reference, Table 2 shows values reported by Mitsuda (Teru Mitsuda, "Proteins and Amino Acids of Rice," p. 196(1974), published by Zenhaikyu).

TABLE 1

Protein Composition and Water Content of Samples (%)

| Item | Usual rice | Treated rice |
|---|---|---|
| Proteins | 5.7 (100) | 6.2 (100) |
| Albumin | 0.7 (12.3) | 0.3 (4.8) |
| Globulin | 0.5 (8.8) | 0.1 (1.6) |
| Prolamin | 0.2 (3.5) | 0.1 (1.6) |
| Glutelin | 4.3 (75.4) | 5.7 (91.9) |
| Water | 15.1 | 25.5 |

| Item | Treated rice 2 | Treated rice 3 | Treated rice 4 |
|---|---|---|---|
| Proteins | 5.7 (100) | 5.6 (100) | 5.7 (100) |
| Albumin | 0.3 (5.3) | 0.3 (5.4) | 0.3 (5.3) |
| Globulin | 0.4 (7.0) | 0.3 (5.4) | 0.3 (5.3) |
| Prolamin | 0.2 (3.5) | 0.1 (1.8) | 0.1 (1.8) |

TABLE 1-continued

Protein Composition and Water Content of Samples (%)

| Glutelin | 4.8 (84.2) | 4.9 (87.4) | 5.0 (87.6) |
|---|---|---|---|
| Water | 23.4 | 23.7 | 23.1 |

The values in parentheses are proportions in Proteins.

The nitrogen-protein conversion coefficient used for all the samples was 5.95 (The value as albumin protein, globulin protein, prolamin protein or glutelin protein was used for the corresponding component.)

TABLE 2

Component Proteins of Polished Rice, Rice Bran and Protein Body (%)

| Protein | Polished rice | Rice bran | Protein body |
|---|---|---|---|
| Albumin | 12.3 | 11.5 | 5.0 |
| Globulin | 11.7 | 7.2 | 7.6 |
| Prolamin | 9.0 | 7.0 | 7.7 |
| Glutelin | 62.3 | 60.4 | 57.7 |

Usual rice and treated rice 1 were 5.7% and 6.2%, respectively, in protein content, 15.1% and 25.5%, respectively, in water content and therefore 6.7% and 8.3%, respectively, in protein content calculated as an anhydride.

Treated rices 1 to 4 are lower than usual rice in globulin content among the protein contents. Even the application of 1000 atm produces a distinct difference in this content. Further the higher the pressure applied, the lower is the globulin content, and the sample subjected to the pressure of 6000 atm exhibits the best result of all the samples. These results appear to indicate that the denaturation of proteins and gelatinization of starch due to the pressure treatment influenced extraction of the proteins.

The treated rices were higher in glutelin content. Since the glutelin fraction was obtained from the precipitate resulting from the extraction of albumin, globulin and prolamin, the glutelin value of the treated rice appears to include the protein denatured by the pressure treatment in addition to the remaining glutelin.

Stated in greater detail, the test method was as follows.

1) Preparation of samples

Since the size of particles influence the protein extraction ratio, particles substantially uniform in size were prepared. Usual rice was pulverized by a coffee mill and then screened with a 250-μm sieve, and the minus particles were collected as a sample.

The treated rice was higher than usual rice in water content, failed, as pulverized by the coffee mill, to pass through the sieve, was therefore dried for 2 hours in a dryer set to 60° C. and thereafter treated in the same manner as usual rice to obtain a sample.

2) Defatting treatment

A 50 g quantity of the sample prepared was accurately weighed out and placed into a stainless steel centrifugal tube, 100 ml of diethyl ether was added to the sample, and the mixture was stirred by a magnetic stirrer for 30 minutes, followed by centrifuging at 10000 G and 2° C. for 15 minutes to separate the mixture into a supernatant and a sediment. Diethyl ether was added to the sediment as separated from the supernatant, followed by the same defatting procedure as above. This procedure was repeated three times.

The sediment obtained was allowed to stand at room temperature to evaporate the diethyl ether.

3) Separation and quantitative determination of albumin and globulin (1) Extraction with sodium chloride solution The sediment obtained by the treatment 2) was placed into a 500-ml Erlenmeyer flask, and shaken at room temperature for 2 hours with addition of about 300 ml of 3% sodium chloride solution for extraction. The mixture was thereafter returned to the original centrifugal tube, centrifuged at 10000 G and 10° C. for 15 minutes and thereby separated into a supernatant and a sediment. The supernatant was collected in another centrifugal tube, while the sediment was similarly subjected to extraction with addition of about 300 ml of sodium chloride solution. The same procedure as above was repeated once more.

(2) Precipitation with ammonium sulfate

Ammonium sulfate was added to the supernatant obtained by the step (1) to saturation to precipitate all proteins, followed by centrifuging at 10000 G and 10° C. for 15 minutes to separate the reactant into a sediment and a supernatant. The sediment was suspended in a small amount of water, and the suspension was dialyzed to fully remove ammonium sulfate using water as an external liquid. The resulting dialyzate was centrifuged at 10000 G and 10° C. for 15 minutes. The resulting supernatant was taken as an albumin fraction, and the sediment as a globulin fraction.

4) Separation and quantitative determination of prolamin and glutelin

The sediment obtained by the extraction with 3% sodium chloride solution was transferred into a 500-ml Erlenmeyer flask, and shaken at room temperature for 2 hours with addition of about 300 ml of 70% ethyl alcohol solution. The mixture was thereafter returned to the original centrifugal tube, centrifuged at 10000 G and 10° C. for 15 minutes and thereby separated into a supernatant and a sediment. The supernatant was collected in a beaker, while the sediment was similarly subjected to extraction with addition of about 300 ml of ethyl alcohol. This procedure was repeated once more.

The supernatants obtained by the three extraction procedures with 70% ethyl alcohol were combined together as a prolamin fraction, and the resulting sediment was taken as a glutelin fraction.

The nitrogen content of each of the fractions was determined by the Kjeldahl method.

5) Quantitative determination of protein

The total protein content of each sample prepared by the step 1) was determined by the Kjeldahl method. The protein content of the original sample was calculated by correcting the value obtained in respect of water content.

I claim:

1. A method preparing a cereal treated under a high pressure comprising placing a cereal into a liquid within a pressure chamber, applying a pressure of not lower than 1000 atm to not higher than 9000 atm to the pressure chamber for a period of time required to internally denature the cereal, and drying the cereal after the application of pressure.

2. A method as defined in claim 1 wherein the cereal has its water content reduced to not higher than 20% by being dried after the application of pressure.

3. A method as defined in claim 1 wherein the pressure is applied for at least 10 minutes to not more than 30 minutes.

4. A method as defined in claim 1 wherein the liquid within the pressure chamber has a temperature not lower than 0° C. to not higher than 5° C. during the application of pressure.

5. A method as defined in claim 1 wherein the liquid within the pressure chamber has a temperature not lower than 50° C. to not higher than 90° C. during the application of pressure.

6. A method as defined in claim 1 wherein before the application of pressure, the cereal as washed is immersed in an aqueous solution containing at least one of a sucrose fatty acid ester, sodium hypochlorite and sodium hydrogencarbonate to cause the solution to penetrate into the cereal.

7. A method as defined in claim 6 wherein the aqueous solution has a temperature not lower than 0° C. to not higher than 5° C.

8. A method as defined in claim 7 wherein the liquid within the pressure chamber has a temperature not lower than 0° C. to not higher than 5°C.

9. A cereal treated under a high pressure wherein the cereal has been subjected to a pressure of not lower than 1000 atm to not higher than 9000 atm in a liquid within a pressure chamber for a period of time required for internal denaturation and subsequently dried.

10. A cereal as defined in claim 9, wherein the water content of the dried cereal is not higher than 20%.

* * * * *